Figure 1:
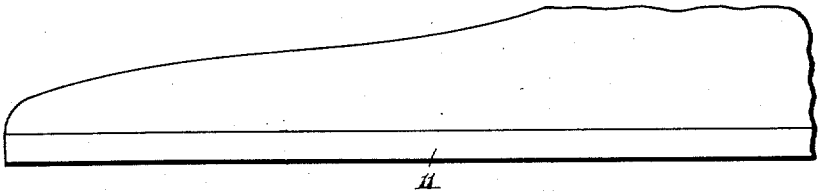
Figure 1:
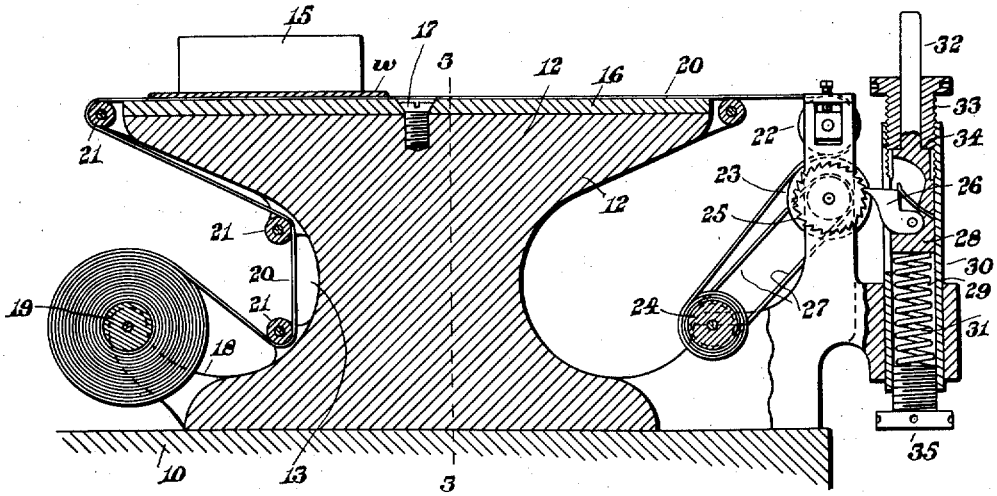

Sept. 18, 1928. A. J. THOMAS Re. 17,085

DIE PRESS

Original Filed Nov. 6, 1924

Inventor:
Alfred J. Thomas,
by Walter E. Lombard,
Atty.

Reissued Sept. 18, 1928. Re. 17,085

UNITED STATES PATENT OFFICE.

ALFRED J. THOMAS, OF BRAINTREE, MASSACHUSETTS, ASSIGNOR, BY MESNE ASSIGNMENTS, TO BENJAMIN W. FREEMAN, OF CINCINNATI, OHIO.

DIE PRESS.

Original No. 1,545,863, dated July 14, 1925, Serial No. 748,077, filed November 6, 1924. Application for reissue filed October 21, 1926. Serial No. 143,308.

The present invention relates to die presses, and more particularly to die presses which are used in the manufacture of shoes such, for instance, as clicking, perforating and cutting-out machines.

In certain styles of shoes, which are very popular, the uppers thereof are ornamented with a design of cut-out portions. These cut-out portions may be formed in die presses at present available to the shoe industry only by forming the cut-out portions in the component parts of the shoe upper before they are assembled and stitched to form the made upper. The beds of die presses at present available to the shoe industry are all flat with vertical sides so that while they may support flatwise a component shoe upper part for the cutting-out operation it is impossible to support flatwise thereon the quarter of a made upper owing to the impossibility of positioning the other quarter out of the way without buckling the quarter presented to the cutting-out tool.

The principal object of the present invention is to produce a die press in which a made upper may be provided with the design of cut-out portions.

To the accomplishment of this object a feature of the present invention contemplates the provision in a die press having a bed, a pressing member and a cutting-out tool, of a work supporting member constructed to support flatwise one of the quarters of a made upper for the cutting-out operation and to position the opposite quarter out of the way without buckling the quarter operated upon.

Broadly considered the work supporting member may be constructed to support flatwise one of the quarters of a made upper for the cutting-out operation and to position the opposite quarter out of the way without buckling the quarter operated upon in any suitable or desirable manner. It is preferred, however, to provide the work supporting member with a top face upon which one of the quarters of a made upper is positioned flatwise for the cutting-out operation and with an end face having a depression therein in which the opposite quarter is positioned during the cutting-out operation. Specifically the top face of the work supporting member is rectangular with a front edge extending substantially the width of the top face and overhanging the body portion of the work supporting member so that the front edge may be interposed between the quarters of a made shoe upper during the cutting-out operation.

In the broader aspects of the invention the work supporting member may be provided with a single depression, but in order to increase the field of usefulness of a single work supporting member to adapt it to support made uppers of many sizes the work supporting member is provided, in addition to the deep depression in its front end face, with shallower depressions in its opposite side faces.

A further object of the present invention is to produce a die press having reliable means for protecting the cutting edge of the cutting-out tool during the cutting-out operation.

To the accomplishment of this object a further feature of the present invention contemplates the provision, in a die press having a bed, a pressing member, a work supporting member movable relatively to the bed, and a cutting-out tool interposed between the members and provided with a cutting edge directed towards one of said members, said pressing member being movable towards the work supporting member to cause the cutting edge of the tool to cut through the work, of a sheet of soft material for protecting the cutting edge of the tool on the member towards which the cutting edge is directed.

Broadly considered it is immaterial which one of the members is provided with the sheet of soft material as long as it is the member towards which the cutting edge of the tool is directed. It is preferred, however, to provide the work supporting member with the sheet as this construction permits the use of a die freely movable over the work.

A still further feature of the invention contemplates the provision, in a die press having a bed, a pressing member, a work supporting member movable relative to the bed, a cutting-out tool interposed between the members and provided with a cutting edge directed towards one of said members, said pressing member being movable towards the work supporting member to cause the cutting edge of the tool to cut through the work, and a sheet of soft material for protecting the cutting edge of the tool on the member towards which the cutting edge is directed, of a strip of flexible material movable over the exposed face of said sheet.

In the broader aspects of the invention many different kinds of material may be used for the sheet and strip, but it is preferred to use fibre-board for the sheet and paper for the strip.

Other features of the invention relate to certain devices, combinations and arrangements of parts hereinafter described and then set forth broadly and in detail in the appended claims which possess advantages readily apparent to those skilled in the art.

Figure 2:
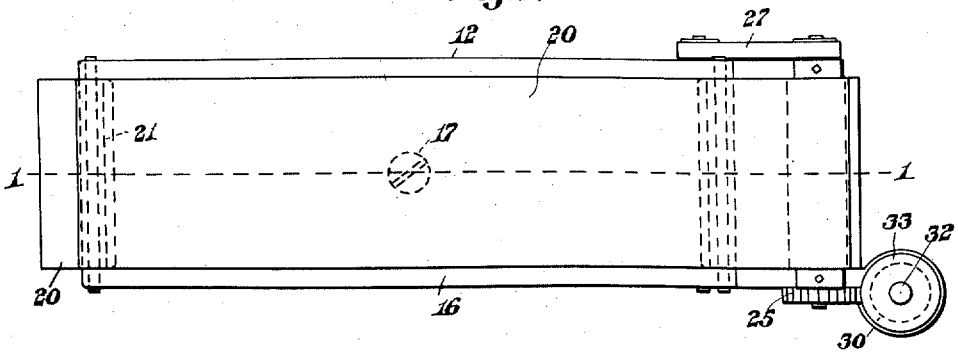
Figure 3:
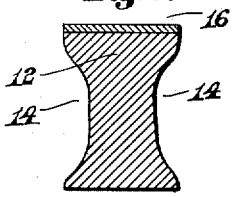

The various features of the present invention will be readily understood from an inspection of the accompanying drawings showing the best form of the invention at present known to the inventor, in which, Figure 1 is a longitudinal sectional elevation of a work supporting member embodying certain principles of the present invention, said work supporting member being shown supported upon the bed of a die press and beneath the reciprocating pressing member thereof, Fig. 2 is a detail in plan of the work supporting member, and Fig. 3 is a section elevation on a reduced scale on the line 3—3, Fig. 1.

As shown in Fig. 1, the die press comprises a bed 10, and a vertically reciprocating pressing member 11. The bed and pressing member specifically form no part of the present invention as any well known press having a bed and a pressing member may be used in connection with the work supporting member disclosed herein. It is deemed unnecessary therefore to further illustrate said press.

Upon the bed 10 is mounted a metal anvil 12 which is not attached to the bed, but retains the position in which it may be placed on account of the weight of said anvil. It constitutes therefore a readily removable work supporting member freely movable over the bed 10.

The anvil 12 is provided with a body portion having a rectangular top face terminating in a front edge extending subsantially the width of the top face. In order to position the quarter of a made shoe upper on the top face flatwise, the front face of the body portion of the anvil 12 is provided with a deep depression 13 (Fig. 2), in which the opposite quarter of the made upper may be positioned without buckling the quarter positioned on the top face. With this construction the front edge of the top face overhangs the body portion so that it may be interposed between the quarters of a made shoe upper. The side faces of the body portion of the anvil 12 are provided with depressions 14 (Fig. 3) which, however, are shallower than the depression 13.

Movable freely over the work W (Fig. 2) on the top face of the anvil 12 is a cutting-out die 15 having its cutting edge directed towards the anvil 12. In operation the made shoe upper is positioned on the anvil with the front edge of the top face of the anvil interposed between the quarters, one of which is positioned flatwise on the top face and the other one of which is positioned in the depression 13. The die 15 is then placed in position to form the cut-out portion in the quarter positioned on the top face. The pressing member is then reciprocated to cause the cutting edge of the die 15 to cut through the work. During the cutting-out operation the made upper is grasped by at least one hand of the operative, but this is not dangerous owing to the space provided around the anvil 12 between the top face of the anvil and the bed 10.

In order to protect the cutting the cutting edge of the die 15 during the cutting-out operation, the top face of the anvil 12 is provided with a fibre-board plate 16 which is secured to said anvil by means of the centrally disposed screw 17 about the axis of which the plate 16 may be rotated, so that when the forward part of the plate becomes unserviceable the rear part thereof may be moved into position over the front part of the anvil 12. When both ends of the plate 16 have become unserviceable the plate may be removed and a new plate substituted therefor.

The anvil has forwardly extending ears 18 in which is revolubly mounted a roll 19 having a strip of paper 20 wound thereon. The paper strip 20 passes partially around guide rolls 21, and over the upper face of the plate 16 to the rear of the anvil 12 where it passes between the feed rolls 22, 23 to a receiving roll 24 on which it is wound as said strip is fed thereto. The feed roll 23 has a ratchet 25 rotatable therewith with which a pawl 26 coacts to give a step by step motion to said feed roll 23. An endless belt 27 from the roll 23 to the receiving roll 23 causes these rolls to rotate in unison. The roll 22 is provided with means for adjusting it toward and from its companion roll 23, thereby regulating the gripping contact of the rolls 22, 23 with the strip 20. The pawl 26 is pivotally mounted on a plunger 28 adapted to reciprocate vertically in the chamber 29 of a cylindrical member 30 mounted on a rear end of the anvil 12.

Beneath the plunger 28 is a helical spring 31 tending to force the plunger 28 upwardly so that the stem 32 thereof will extend a short distance above the top of the die 15 so that when the pressure member 11 descends it will strike said stem 32 and force the plunger 28 downwardly against the tension of the spring 31, thereby permitting the pawl 26 to engage a new tooth of the ratchet 25.

As soon as the die 15 is removed from the work W, after the pressure member 11 has moved upwardly, the spring 31 will force the plunger 28 upwardly, causing the pawl 26 to impart a partial rotation to the ratchet 25, and thus feed the strip 20 and wind it upon the roll 24.

A collar 33 surrounds the stem 32 and is threaded to the upper end of the cylindrical member 30, the lower end of this collar coacting with a shoulder 34 on the plunger 28 to limit the upward movement thereof. A member 35 threaded to the lower end of the cylindrical member 30 is adapted to regulate the tension of the spring 31.

The paper strip 20 is of sufficient thickness to receive the cutting edges of the die 15 without being cut through, but in case these cutting edges do pass through the paper strip they will not be injured as they will simply cut into the face of the fibre-board plate 16.

It is desirable to always have a flat plane face for the cutting edges of the die to coact with when the work W is being operated upon and by giving the strip 20 a step by step movement at each cutting operation a new surface is provided for each successive operation. This is of considerable importance as by this means a cleaner cut is assured.

It will be clear to those skilled in this class of machines and with the general objects of the present invention in view, that changes may be made in the details of structure, the described and illustrated embodiment thereof being intended as an exploitation of its underlying essentials, the features whereof are definitely stated in their true scope in the claims herewith.

What is claimed as new is:—

1. In a die press, the combination with a bed, of a weighted metal anvil freely movable on the bed, a strip of flexible material superimposed thereon, and means supported by said anvil for moving said strip over the surface thereof.

2. In a die press, the combination with a bed and a pressing member, of an anvil freely movable on the bed, two rolls mounted in bearings at the ends of said anvil, a strip of paper on one roll extending over the upper face of said anvil and adapted to be wound on the other roll, and means actuated by the pressing member for rotating said receiving roll.

3. In a die press, the combination with a bed and a pressing member, of an anvil freely movable on the bed, two rolls mounted in bearings at the ends of said anvil, a strip of paper on one roll extending over the upper face of said anvil and adapted to be wound on the other roll, and means actuated by the pressing member for rotating said receiving roll and feeding the strip thereto.

4. In a die press, the combination with a bed and a pressing member, of an anvil freely movable on the bed, two rolls mounted in bearings at the ends of said anvil, a strip of paper on one roll extending over the upper face of said anvil and adapted to be wound on the other roll, rolls at the rear of the anvil for feeding said strip, and means actuated by the pressing member for rotating said receiving roll and feeding rolls.

5. In a die press, the combination with a bed and a pressing member, of an anvil freely movable on the bed, two rolls mounted in bearings at the ends of said anvil, a strip of paper on one roll extending over the upper face of said anvil and adapted to be wound on the other roll, rolls for feeding said strip, a ratchet revoluble with one of said feed rolls, and a reciprocating pawl coacting with said ratchet and adapted to be actuated by the downward movement of the pressing member.

6. In a die press, the combination with a bed and a pressing member, of an anvil freely movable on the bed, two rolls mounted in bearings at the ends of said anvil, a strip of paper on one roll extending over the upper face of said anvil and adapted to be wound on the other roll, rolls for feeding said strip, a ratchet revoluble with one of said feed rolls, a reciprocating pawl coacting with said ratchet and adapted to be actuated by the downward movement of the pressing member, and a spring pressed plunger carrying said pawl.

7. In a die press, the combination with a bed and a pressing member, of an anvil freely movable on the bed, two rolls mounted in bearings at the ends of said anvil, a strip of paper on one roll extending over the upper face of said anvil and adapted to be wound on the other roll, rolls for feeding said strip, a ratchet revoluble with one of said feed rolls, a reciprocating pawl coacting with said ratchet and adapted to be actuated by the downward movement of the pressing member, a spring pressed plunger carrying said pawl, and means for controlling the movement of said plunger.

8. In a die press, the combination with a bed and a pressing member, of a work supporting member movable relatively to the bed, a tool supported by the work supporting member provided with a cutting edge directed towards one of said members, said pressing member being movable towards the work supporting member to cause the cutting edge of the tool to cut through the work, and a sheet of fibre-board for protecting the cutting edge of the tool on the member towards which the cutting edge is directed.

9. In a die press, the combination with a bed and a pressing member, of a work supporting member movable relatively to the bed, a tool supported by the work supporting member provided with a cutting edge directed towards one of said members, said pressing member being movable towards the work supporting member to cause the cutting edge of the tool to cut through the work, a sheet of fibre-board for protecting the cutting edge of the tool on the member towards which the cutting edge is directed, and a strip of paper movable over the exposed face of said fibre-board.

10. In a die press, the combination with a bed and a pressing member, a work supporting member, a tool having a cutting edge interposed between the members, said members being relatively movable to cause the cutting edge of the tool to cut through the work, and means for protecting the cutting edge of the tool comprising a sheet of soft material and a strip of flexible material interposed between the cutting edge and the face of one of the members.

11. In a die press, the combination with a pressing member, of a work supporting member, a tool having a cutting edge interposed between the members, said members being relatively movable to cause the cutting edge of the tool to cut through the work, and means for protecting the cutting edge of the tool comprising a sheet of fibre-board and a strip of paper interposed between the cutting edge and the face of one of the members.

12. In a die press, the combination with a bed and a pressing member, a work supporting member, a tool having a cutting edge interposed between the members, said members being relatively movable to cause the cutting edge of the tool to cut through the work, and means for protecting the cutting edge of the tool comprising relatively soft material and a strip of flexible material interposed between the cutting edge and the face of one of the members.

In testimony whereof I have signed my name to this specification.

ALFRED J. THOMAS.